May 24, 1932.  P. G. BEREMAND  1,859,426
UNIVERSAL JOINT
Filed Jan. 13, 1930

Inventor
Preston G. Beremand
By Frank C. Earman.
Attorney

Patented May 24, 1932

1,859,426

UNITED STATES PATENT OFFICE

PRESTON G. BEREMAND, OF LAKEWOOD, OHIO

UNIVERSAL JOINT

Application filed January 13, 1930. Serial No. 420,372.

This invention relates to universal joints such as used in connection with the drive shaft of automotive vehicles, and for the connection of various shaft sections which are subject to misalignment.

One object of the invention is to design a universal joint provided with a continuous unobstructed passage through which air, oil, steam or a liquid of any kind may be conducted without leakage, and which is also applicable to motor vehicles, or to any other use for which a universal joint is at present employed.

A further object is to provide a universal joint which is of simple construction, which can be easily and readily assembled, and which can be economically manufactured.

A still further object is to provide a universal joint of simple and substantial construction, which will permit of a free universal action without cutting off or curtailing the supply of air, steam, or liquid passing through the joint.

With the above and other objects in view, the present invention consists in the combination and arrangement of parts, hereinafter more fully described, illustrated in the accompanying drawings, and particularly pointed out in the appended claims, it being understood that changes may be made in the form, size, proportion, and minor details of construction, without departing from the spirit, or sacrificing any of the advantages of the invention.

Figure 1:
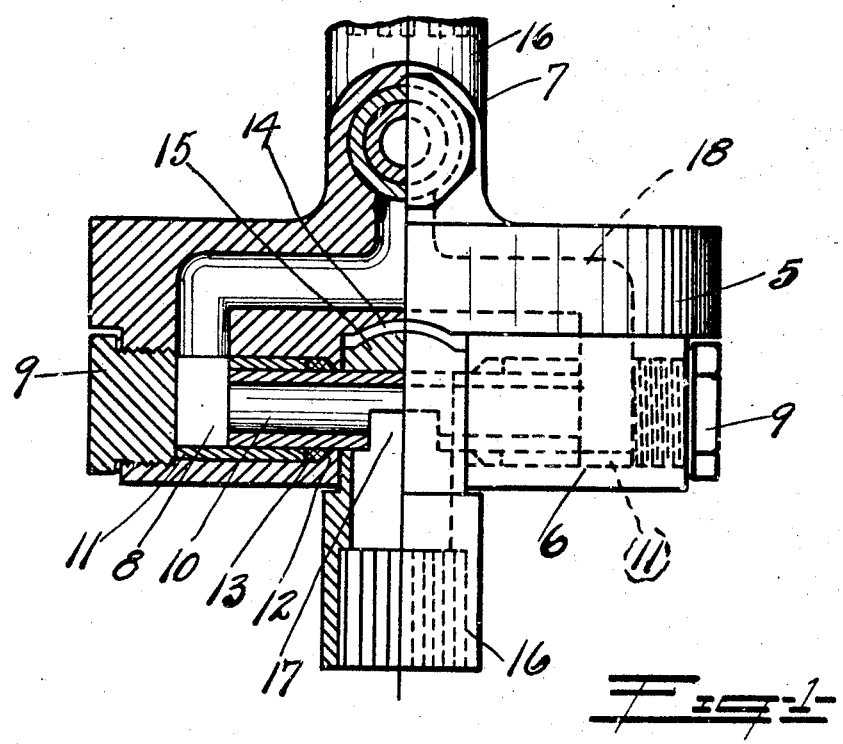
Fig. 1 is a part sectional plan view of the joint.
Figure 2:
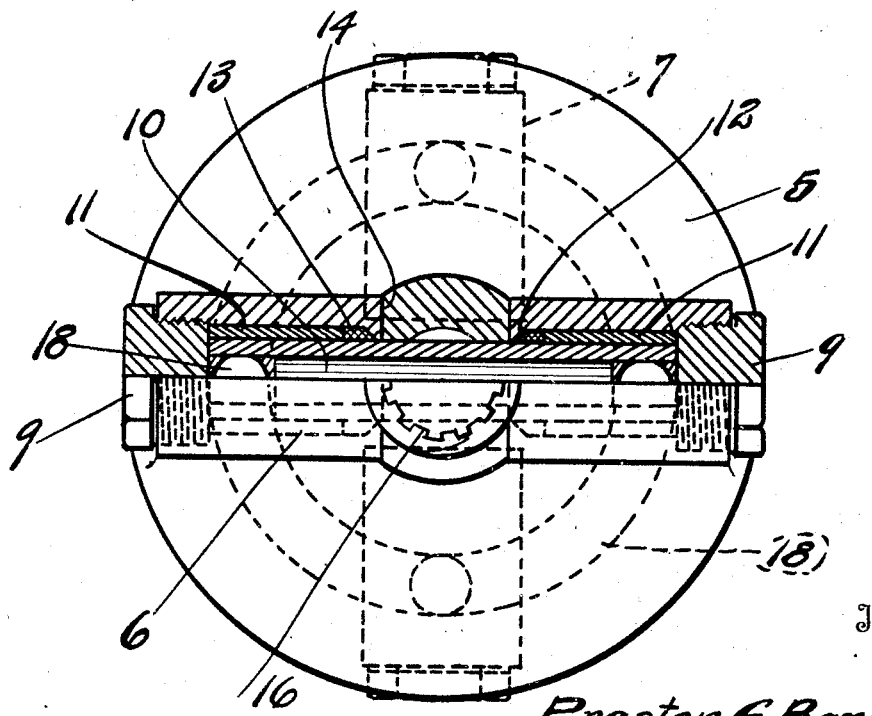
Fig. 2 is a part sectional end view thereof.

Referring now particularly to the drawings, the numeral 5 indicates the body of the joint, this is preferably disk shaped and is provided with bosses 6 and 7 respectively, which are cast on opposite sides of the disk, each boss being disposed in a different plane, and each is also longitudinally bored as shown at 8 to provide a continuous passage through the boss, the ends of the bore being threaded, and plugs 9 are mounted therein and form a closure for said ends.

Each boss, the mechanism assembled therein, together with the operation is identical, excepting that they are disposed in opposite planes, and I shall therefore describe the construction and operation of but one only.

A hollow shaft 10 is mounted in the boss as shown, and sleeves 11 embrace the ends of the shaft, the bore being shouldered as shown at 12, and a packing ring 13 is interposed between the said shoulder and the end of the sleeve 11, providing a tight leak-proof joint thereat. A centrally disposed passage 14 is provided intermediate the length of each boss, said passage being of suitable size to accommodate the bearing 15, which is provided on the end of the splined drive sleeve 16, said bearing being mounted on the shaft 10, the outer end of the sleeve 16 being machined to receive the spindled end of a drive shaft, (not shown), the shaft 10 being provided with a port 17 to permit the passage of air, steam, or a liquid, so that if the drive shaft were a pipe, and the joint was to be interposed in a line for conveying air, steam, or liquid, it would flow through the drive sleeve 16, thence into the hollow shaft 10, thence into the circular passage 18, provided in the disk, said passage leading into the hollow shaft in the opposite boss, and thence into the connecting splined sleeve on the opposite side of the joint, the area of the passage being uniform and unobstructed at all times, regardless of the angular relation of one splined sleeve with relation to the other.

When the joint is to be used in connection with a vehicle drive shaft, it is packed with grease by simply removing the plugs 9, the grease will thoroughly lubricate all working parts and is not thrown out by centrifugal action set up by the rotation of the drive shaft.

The joint can be readily assembled, is composed of few parts which are of substantial construction, all of which can be perfectly lubricated so that it requires no attention after installation.

From the foregoing description, it will be obvious that I have perfected a very simple, economical and substantial joint for connecting misalignment shafts and conveying air, steam, or liquids of any nature.

What I claim is:

1. A universal joint comprising a centrally disposed disk, bosses formed integral therewith and on opposite faces thereof, a hollow shaft mounted in said boss, a sleeve journaled thereon, and a continuous passage through said disk and hollow shafts.

2. A universal joint comprising a main body, bosses formed on opposite faces thereof, an opening through said bosses, a hollow shaft mounted therein, sleeves provided with bearings journaled on said shafts, and a communicating passage connecting said hollow shafts and opening into said sleeves to form a continuous passage through the joint.

3. A universal joint comprising a main body, bosses formed on opposite faces thereof, an opening through said bosses, hollow shafts mounted therein, centrally disposed sleeves provided with bearings journaled on said shafts, a continuous passage leading from one sleeve to the other, and plugs forming closures for the openings in the bosses.

4. A universal joint comprising a main body, bosses formed on opposite faces thereof, a continuous opening through said bosses, hollow shafts mounted therein, a centrally disposed sleeve provided with a bearing journaled on each shaft, a continuous passage from one hollow shaft to the other, and an opening in each shaft which communicates with the sleeve.

5. A universal joint comprising a main body, bosses formed on opposite faces thereof, said bosses being provided with openings intermediate their lengths, hollow shafts mounted in said openings, sleeves surrounding said shafts, main drive sleeves provided with bearings journaled on said shafts, a continuous passage leading from one hollow shaft to the other, and openings in the shaft for establishing communication between said shaft and the drive sleeves.

6. A universal joint comprising a main body, bosses on opposite faces thereof, drive sleeves connected to each respective boss and a continuous passage from one drive sleeve to the other.

7. A universal joint comprising a main body, bosses on opposite faces thereof and to which drive sleeves are pivotally connected and a continuous uninterrupted leak-proof passage leading from one drive sleeve to the other.

In testimony whereof I hereunto affix my signature.

PRESTON G. BEREMAND.